United States Patent
Bender

(10) Patent No.: US 7,042,869 B1
(45) Date of Patent: May 9, 2006

(54) METHOD AND APPARATUS FOR GATED ACK/NAK CHANNEL IN A COMMUNICATION SYSTEM

(75) Inventor: Paul E. Bender, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 1111 days.

(21) Appl. No.: 09/653,744

(22) Filed: Sep. 1, 2000

(51) Int. Cl.
*H04L 1/00* (2006.01)

(52) U.S. Cl. .................... 370/349; 370/394

(58) Field of Classification Search ............. 370/229, 370/235, 310, 342, 345, 349, 389, 394
See application file for complete search history.

(56) References Cited

U.S. PATENT DOCUMENTS

| | | | |
|---|---|---|---|
| 5,101,501 A | 3/1992 | Gilhousen et al. | |
| 5,103,459 A | 4/1992 | Gilhousen et al. | |
| 5,267,261 A | 11/1993 | Blakeney, II et al. | |
| 5,537,414 A | 7/1996 | Takiyasu et al. | |
| 5,577,024 A * | 11/1996 | Malkamaki et al. | 370/335 |
| 5,636,230 A | 6/1997 | Marturano et al. | |
| 6,611,515 B1 * | 8/2003 | Balachandran et al. | 370/349 |
| 6,665,382 B1 * | 12/2003 | Dunn et al. | 379/93.32 |

FOREIGN PATENT DOCUMENTS

WO    9923844    5/1999

* cited by examiner

*Primary Examiner*—Ricky Ngo
*Assistant Examiner*—Derrick W Ferris
(74) *Attorney, Agent, or Firm*—Philip Wadsworth; Sandra L. Godsey; S. Hossain Beladi

(57) ABSTRACT

A method and apparatus are disclosed for transmitting ACK/NAK information in a communication system including a transmitter (74) for transmitting ACK/NAK information on an ACK/NAK channel, and a channel gate (699) for gating the ACK/NAK channel based on whether a matching preamble is detected in a received data unit by receiver (106). The data unit is a first data unit in a series of data units comprising a data packet. The channel gate (699) prevents transmission of the ACK/NAK channel when receiver (106) has failed to receive the matching preamble in the data unit.

16 Claims, 7 Drawing Sheets

METHOD AND APPARATUS FOR GATED ACK/NAK CHANNEL IN A COMMUNICATION SYSTEM

BACKGROUND

I. Field of the Invention

The present invention relates to the field of communications. More particularly, the present invention relates to a novel method and apparatus for a gated ACK/NAK channel in a communication system.

II. Background

Effectiveness of a communication channel between two terminals may be improved by utilizing error control coding. With use of error control coding, however, certain transmitted data packets are missed or received erroneously at a receiving terminal. A data packet may be divided into a series of data units, each having a sequence number. The first data unit may carry the preamble identifying a receiving terminal, the first data unit and the subsequent data units carrying the payload.

When a receiving terminal detects a data unit with a sequence number higher than the expected sequence number, the receiving terminal declares the data unit(s) with the sequence number(s) between an expected sequence number and the detected data unit sequence number as missing or erroneously received. The receiving terminal in response sends to the transmitting terminal a control message requesting retransmission of the missing data unit. The transmitting terminal may resend the missing data unit(s) after a time out interval. Such an error control scheme leads to inefficient use of resources, particularly when there are many terminals receiving data units.

In a communication system in which several access terminals are, for example, in a connected state with an access point, each receiving access terminal replies with either an ACK or NAK, receptively, for acknowledging or negative acknowledging proper reception of the data units. The access point may not be sending data units to every access terminal in the connected state. Since the access terminals may have limited knowledge of when a data unit is transmitted to them, the channel in the direction of access terminal to access point, the reverse link direction, then may be occupied with transmissions of ACK/NAK signals causing unnecessary interference.

Generally, to this end and as well as others, there exists a need in the art for an ACK/NAK mechanism that makes efficient use of resources.

SUMMARY

The disclosed method and apparatus includes a transmitter for transmitting ACK/NAK information on an ACK/NAK channel, and a channel gate for gating the ACK/NAK channel based on whether a companion receiver has detected a matching preamble in a data unit received by the receiver. In one embodiment, the data unit is a first data unit in a series of data units comprising a data packet, and the channel gate may prevent transmission of the ACK/NAK channel when the receiver has failed to receive the matching preamble in the data unit. In one embodiment, the transmitter may include a BPSK modulator for modulating the ACK/NAK information, and a multiplier for Walsh covering a result of the BPSK modulator to produce Walsh covered ACK/NAK information for transmission on the ACK/NAK channel. The method and apparatus may include a summer for summing the ACK/NAK channel and a data rate control/pilot channel. The ACK/NAK channel in an exemplary embodiment may have a duration of a portion of a time slot.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

A novel and improved method and apparatus for transmitting ACK/NAK information on an ACK/NAK channel is described. The exemplary embodiment described herein is set forth in the context of a digital cellular telephone system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
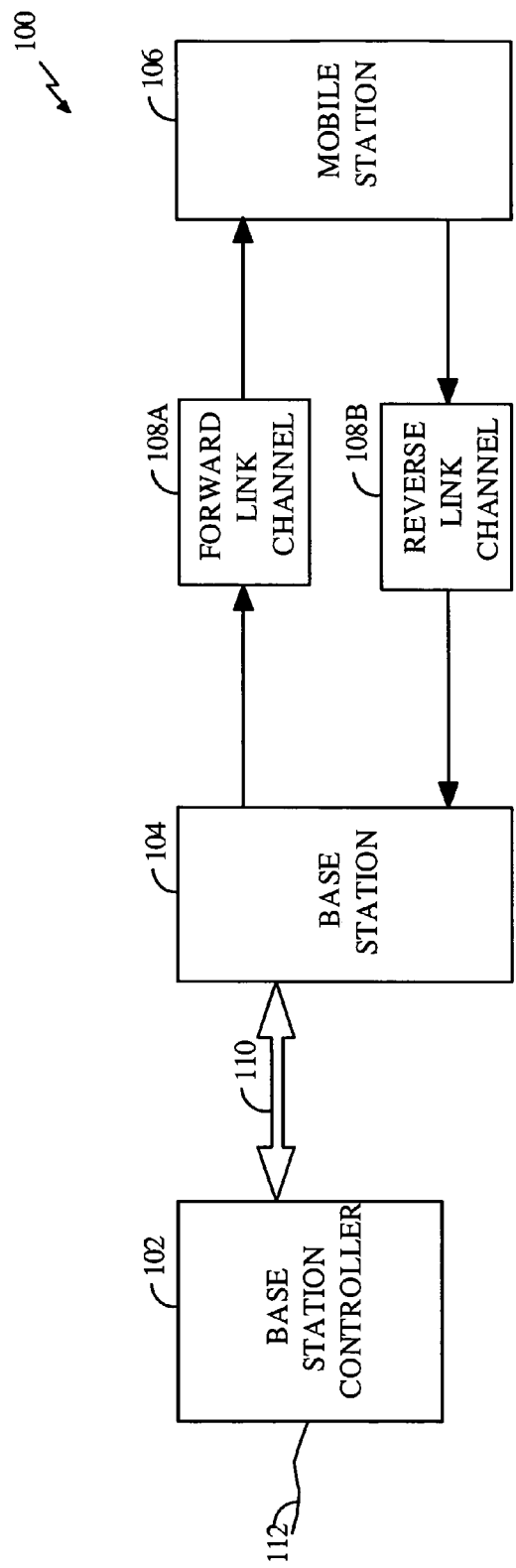
FIG. 1 is a block diagram of an exemplary communication system.

FIG. 1 illustrates an exemplary communication system 100 capable of implementing embodiments of the invention. A first terminal 104 transmits signals to a second terminal 106 over a forward link 108A, and receives signals from the second terminal 106 over a reverse link 108B. Terminals 104 and 106 may be operating as a transmitter unit or a receiver unit, or both concurrently, depending on whether data is being transmitted from, or received at, the respective terminals 104 and 106. Terminals 106 and 104 may be respectively a mobile station (MS) and a base station (BS) or any other communication devices. Forward and reverse links 108A and 108B may be electromagnetic spectra or wireline. A BS controller 102 may be coupled to BS 104 for controlling communication system 100.

For simplicity, communication system 100 is shown to include one BS 104 and one MS 106; however, other variations and configurations of the communication system 100 are possible. For example, in a multi-user, multiple access communication system, a single BS may be used to concurrently transmit data to a number of mobile stations. In addition, in a manner similar to soft handoff, disclosed in U.S. Pat. No. 5,101,501, entitled "SOFT HANDOFF IN A CDMA CELLULAR TELEPHONE SYSTEM," and U.S. Pat. No. 5,267,261, entitled "MOBILE STATION ASSISTED SOFT HANDOFF IN A CDMA CELLULAR COMMUNICATIONS SYSTEM," assigned to the assignee of the present invention and incorporated by reference herein, a MS may concurrently receive transmissions from a number of base stations. The communication system of the embodiments described herein may include any number of base stations and mobile stations. Consequently, each of the multiple base stations is connected to BS controller (BSC) 102 through a backhaul similar to backhaul 110. The backhaul 110 can be implemented in a number of connection types including, e.g., a microwave or wireline E1 or T1, or optical fiber. A connection 112 connects the wireless communication system 100 to a packet data serving node (PDSN), which is not shown.

In general, a communication link comprises a set of channels carrying logically distinct types of information. These channels may be transmitted according to a scheme of Time Division Multiplexing (TDM), Code Division Multiplexing (CDM), Frequency Division Multiplexing (FDM), or a combination thereof. In a TDM scheme, the channels are distinguished in time domain, where the channels are transmitted one at a time. In a CDM scheme, the channels may be distinguished by a pseudorandom orthogonal sequence. A code division communication system is disclosed in U.S. Pat. No. 5,103,459, entitled "SYSTEM AND METHOD FOR GENERATING SIGNAL WAVEFORMS IN A CDMA CELLULAR TELEPHONE SYSTEM," assigned to the assignee of the present invention and incorporated by reference herein.

Figure 2:
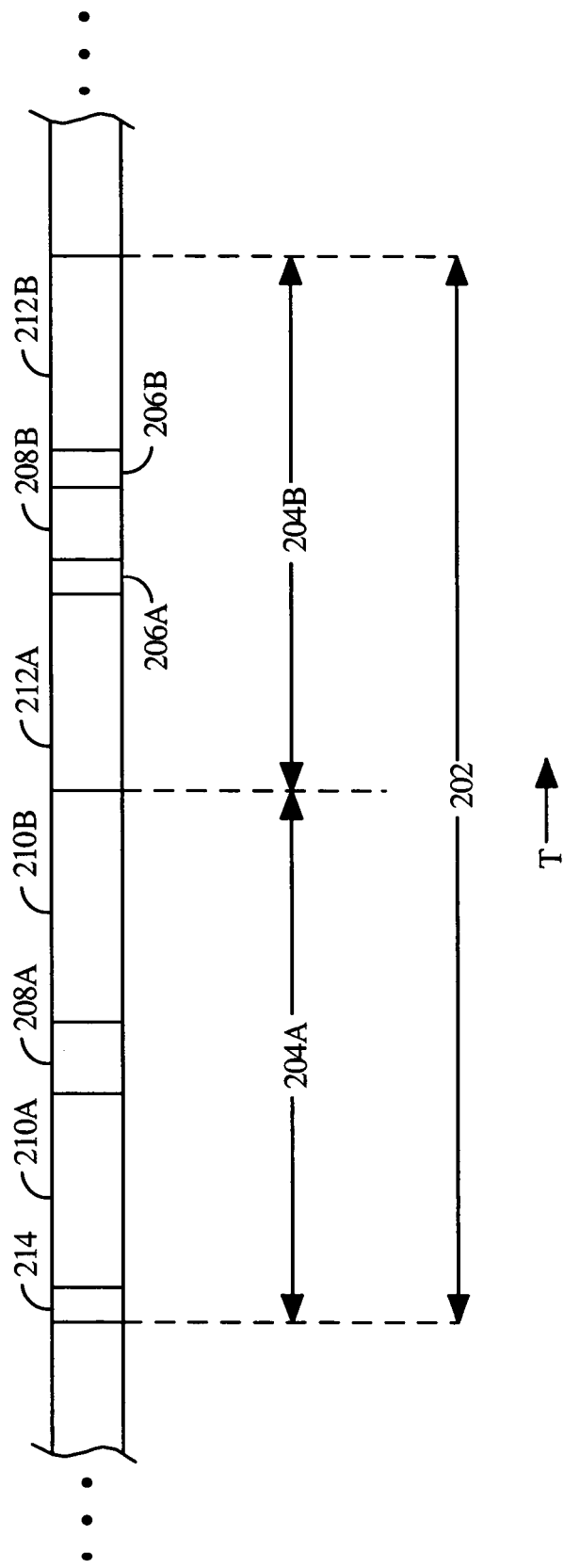
FIG. 2 is an illustration of an exemplary forward link signal structure.

Forward link 108A may include a set of channels, e.g., a pilot channel, a medium access channel, a traffic channel, and a control channel. The control channel is a channel carrying signals for reception by all mobile stations in the area covered by communication system 100. To operate in the system, each MS may need to monitor at least one control channel. The traffic channel carries data. The control channel may carry information necessary for demodulation of data being carried on the traffic channel. A forward link signal structure in accordance with an exemplary embodiment is shown in FIG. 2. The reverse link 108B includes a set of channels, e.g., a traffic channel and an access channel. The reverse traffic channel is dedicated to transmission from a single MS to the BSs comprising a network. The reverse access channel is used by a MS to communicate with the BSs in the network prior to or while establishing a traffic channel.

In an exemplary embodiment, each MS monitors at least one signal quality metric of signals received from BSs. An MS (for example MS 106) receiving forward link signals from multiple BSs identifies the BS associated with the highest quality forward link signal (for example BS 104). MS 106 then generates a prediction of a data rate at which the Packet Error Rate (PER) of data packets received from the selected BS 104 will not exceed a target PER. A target PER of approximately 2% may be used. MS 106 then computes a rate at which a "tail probability" is greater than or equal to the target PER. The tail probability is the probability that the actual signal quality during the packet transmission period is less than the signal quality required for successful decoding of a packet correctly at a given rate. MS 106 then sends a message on the reverse link 108B specifically to the selected BS 104, requesting the data rate at which the specific selected BS may transmit forward link data to the MS 104. The message may be sent on a Data Rate Control channel (DRC). The use of DRC is disclosed in application Ser. No. 08/963,386 entitled: "A METHOD AND AN APPARATUS FOR HIGH RATE DATA PACKET TRANSMISSION," now U.S. Pat. No. 6,574,211, issued Jun. 3, 2003 to Padovani et al., assigned to the assignee of the present invention, and incorporated by reference herein. A dedicated reverse link Medium Access Channel (R-MACCH) may be utilized for carrying the DRC information, a Reverse Rate Indicator (RRI), and Selective Acknowledgement (SA) information.

BS 104 may monitor the reverse channel from one or more MSs and may transmit data on the forward link 108A to no more than one destination MS during each forward link transmit time slot. In one embodiment, BS 104 selects a destination MS (for example MS 106) based on a scheduling procedure designed to balance the grade of service (GoS) requirements of each MS with the desire to maximize throughput of the system 100. BS 104 transmits data to MS 106 only at the rate indicated by the most recent DRC message received from the destination MS 106. This restriction makes it unnecessary for MS 106 to perform rate detection on the forward link signal. MS 106 determines whether it is the intended destination MS during a given time slot.

In one embodiment, the data packet for transmission includes a preamble within the first time slot of each new forward link packet for identifying the intended destination MS. Each MS receiving the preamble decodes the information and, based on the decoded preamble, establishes whether it is the intended destination of the data packet. The intended destination MS begins decoding the data in the associated time slot. The destination MS determines the data rate of the data in the forward link based on the DRC request message. The number of forward link time slots used to transmit a packet varies based on the data rate at which the packet is sent. Packets sent at a lower rate are sent using a greater number of time slots. The destination MS decodes the received data packet and evaluates a quality metric associated with the received data packet. The quality metric of a packet may be defined by a formula in accordance with a content of the packet, e.g., a parity bit, a Cyclic Redundancy Check (CRC), and etc. The evaluated quality metric and the quality metric contained in the received packet are compared, and based on the comparison an appropriate SA is generated. The SA may be ACK based, which includes sending an ACK message from the MS to the BS if a data packet is correctly decoded, and no message is sent when the data packet is incorrectly decoded. If the SA is NAK based, a NAK message is sent from the MS to the BS only if a data packet is incorrectly decoded.

An advantage of a NAK approach includes high reliability and low noise interference with other reverse links, as well as possible energy saving at the MS. A BS transmitting a data packet intended for only one MS allows achieving low interference on the reverse link when the probability of the MS incorrectly decoding the packet is low. Furthermore, if the NAK is a bit of zero energy, the NAK contains low energy and the MS may allocate less power to the transmission of the NAK bit.

In an exemplary embodiment, an SA code channel orthogonal to the reverse link 108B can be advantageously utilized to transmit ACK or NAK messages. Because a BS is transmitting a data packet intended for only one MS, at most this MS sends the SA, thus achieving a low interference on the reverse link 108B. A dedicated reverse link medium access channel (R-MACCH) may be utilized for transmission of the DRC, RRI, and ACK/NAK information. The BS after detecting an SA channel determines whether a retransmission of the packet is necessary. If the SA indicates that a retransmission is necessary, the packet is scheduled for retransmission. Otherwise, the packet is discarded.

FIG. 2 shows the forward link signal structure transmitted by each BS in an exemplary high data rate system in accordance with a particular embodiment. Forward link signals are divided into fixed-duration time slots. Each time slot is 1.67 milliseconds long. Each slot 202 is divided into two half-slots 204A and 204B, with a pilot burst 208A or 208B transmitted within each half-slot 204A or 204B. In an exemplary embodiment, each slot is 2048 chips long, corresponding to a 1.67 millisecond slot duration. In an exemplary embodiment, each pilot burst 208A or 208B is 96 chips long, and is centered at the mid-point of its associated half-slot 204A or 204B. A reverse link power control (RPC) signal 206A or 206B is transmitted on both sides of the pilot burst 208B in every second half-slot 204B. The RPC signal may be transmitted for 64 chips immediately before and 64 chips immediately after the second pilot burst 208B to regulate the power of the reverse link signals. Forward link traffic channel data is sent in the remaining portions 210A and 210B of the first half-slot 204A and the remaining portions 212 of 212A and 212B of the second half-slot 204B. Preamble 214 is 64 chips long and is transmitted once for each data packet. The preamble 214 is MS specific because the traffic channel stream is intended for a particular MS. Since each data packet is divided into multiple data units, and each unit is transmitted during a slot time, the first time slot contains the preamble 214 identifying the destination MS for receiving the data stream in the first and subsequent time slots.

Figure 3:
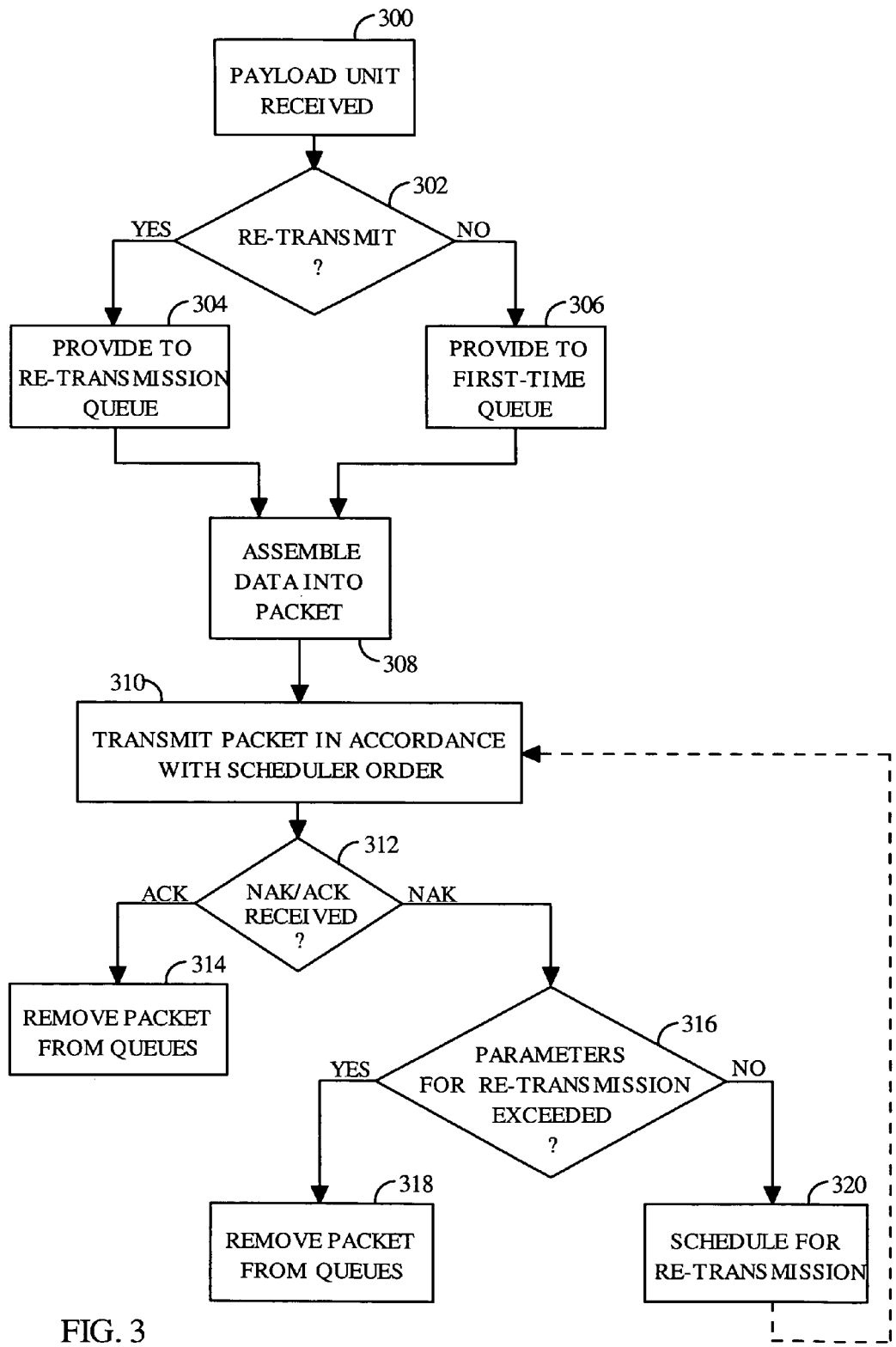
FIG. 3 is a flowchart of an exemplary method of data processing at a transmitting terminal.

FIG. 3 is an exemplary flowchart of a method for a BS to use a Quick Automatic Request (QARQ) scheme to transmit or retransmit a packet to a MS in accordance with an embodiment. At step 300, the BS receives a payload unit intended for transmission to a MS. At step 302, the BS determines whether the payload unit is a payload unit to be transmitted or a payload unit to be retransmitted. A retransmission request may be initiated only by a radio link protocol (RLP) at this step. If the payload unit is to be transmitted, the method continues to step 306, in which the payload unit is provided to a first-time queue. If the payload unit is to be retransmitted, the method continues in step 304, in which the payload unit is provided to a retransmission queue. At step 308, the BS assembles payload units intended for a particular MS to a packet, the structure of which is determined in accordance with a transmission data rate. The data rate of the packet is based on the DRC feedback signal received over the reverse link from the destination MS. The data packet may be transmitted over multiple time slots. The first time slot is transmitted with the preamble. The preamble identifies the intended destination MS. The preamble could alternatively be transmitted in every forward link time slot. At step 310, the BS transmits the data packet in accordance with a scheduler order. After the data packet has been transmitted, the BS tests at step 312 if an SA corresponding to the transmitted data packet was received.

If an ACK is received (or a NAK is not received) in the expected time slot, the method continues at step 314. At step 314, the packet is removed from the first-time and retransmission queues, and the packet is discarded. If a NAK is received (or an ACK is not received) in the expected time slot, the method continues at step 316. At step 316, parameters controlling retransmission are tested. The parameters assure that a particular packet will not be retransmitted repeatedly, which would increase buffer requirements and decrease throughput of a communication system. The parameters may include the maximum number of times a packet can be retransmitted and the maximum time for which a packet can remain in the first-time queue after the packet has been transmitted. If the parameters were exceeded, the packet is removed from the first-time and retransmission queues, and the packet is discarded at step 318. In this scenario, the QARQ retransmission processing ends and the packet may be retransmitted upon request. If the parameters were not exceeded, the packet is rescheduled for retransmission at step 320.

Figure 4:
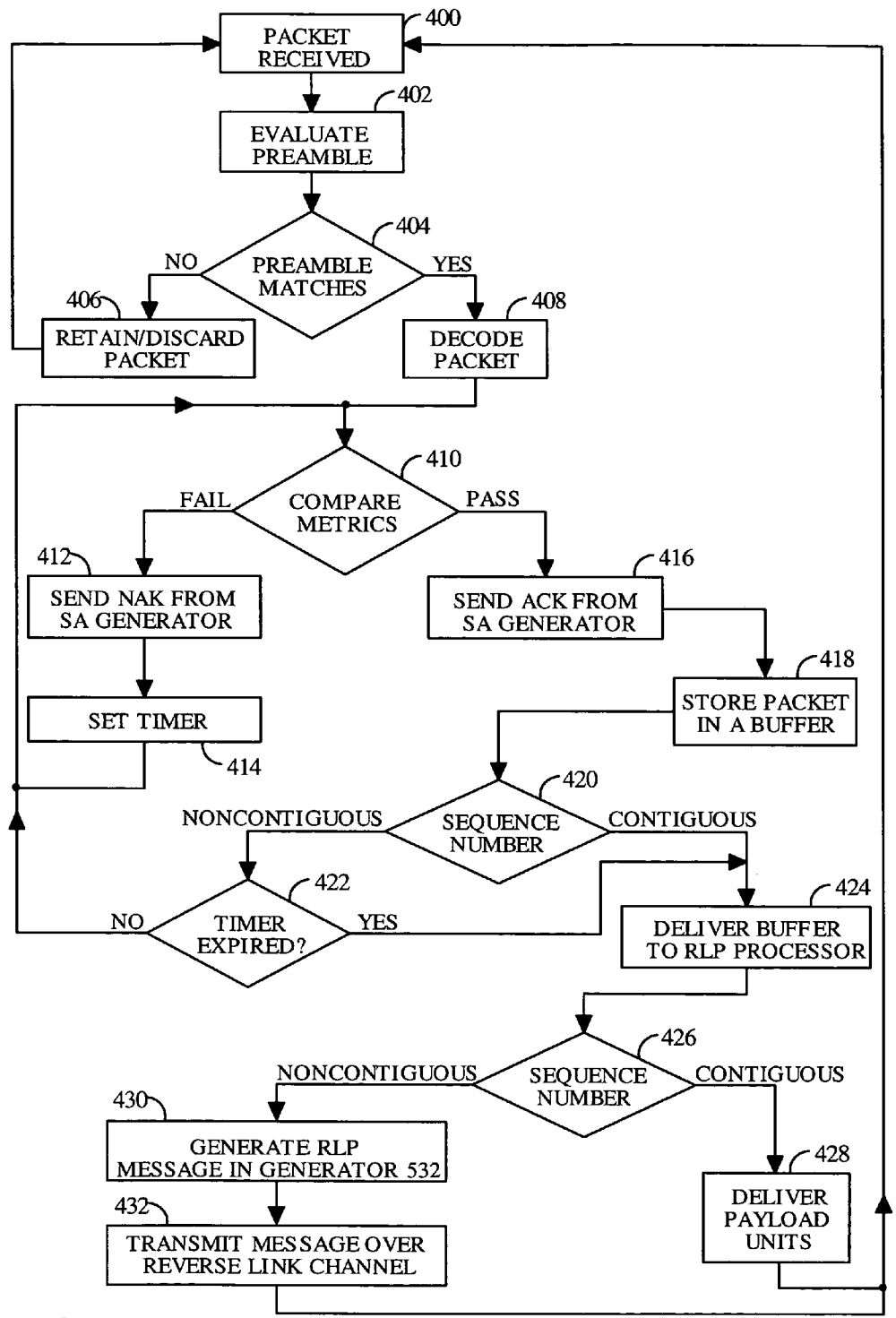
FIG. 4 is a flowchart of an exemplary method of data processing at a receiving terminal.

FIG. 4 is an exemplary flowchart of a method for an MS to use QARQ to generate a response to a BS in accordance with one embodiment. At step 400, the MS receives a data unit of a data packet from the BS. At step 402, the preamble of the packet is extracted and evaluated. The preamble is compared with a reference preamble at step 404. The packet is discarded at step 406 if the preamble indicates that the packet is intended for another MS, and the flow returns to step 400 to wait for another packet or, in the alternative, the packet may be retained for soft combining with retransmissions of the same packet. If the preamble indicates that the packet is intended for the MS, the MS decodes the packet at step 408 and evaluates a quality metric of the received packet.

At step 410, the evaluated quality metric and the quality metric information contained in the received packet are compared. If the evaluated quality metric and the quality metric contained in the received packet do not match, indicating improper decoding of the packet, an appropriate SA is sent at step 412. The SA may be a NAK response. A timer for the SA sent then starts at step 414. The purpose of the timer is to limit a period for which the MS waits for retransmission of the payload units of the incorrectly decoded packet. If the payload units of the incorrectly decoded packet are not received within the timer expiration period for the NAK associated with the incorrectly decoded packets the QARQ processing is aborted and the RLP handles the missing payload units.

If the packet was correctly decoded at step 410, an appropriate SA is sent at step 416. The payload unit(s) contained in the packet are then stored in a buffer at step 418. At step 420, the RLP sequence numbers of the payload units are tested against expected values of the RLP sequence numbers.

If the RLP sequence numbers indicate contiguity, it means that all the payload units of the packet transmitted to the MS were properly received. Consequently, all the payload units with contiguous sequence numbers contained in the buffer are provided to an RLP layer at step 424. If the RLP sequence numbers indicate non-contiguity, the timer corresponding to the last NAK sent (which was started at step 414) is checked at step 422. If the timer has not expired, the MS waits for retransmission of the missing payload units or expiration of the timer for the last NAK sent.

If the timer for a particular NAK, and consequently a particular set of missing payload units has expired, the QARQ scheme for these payload units is aborted. All payload units stored in the buffer with sequence numbers higher than the missing payload units associated with the particular NAK and lower than the missing units associated with the next NAK (if any) are provided to an RLP layer at step 424.

At step 426, the RLP layer checks the sequence numbers of the delivered payload units. If the sequence numbers indicate contiguity, the RLP layer delivers data from the buffer to a data sink at step 428. Otherwise, the RLP layer generates an RLP message requesting retransmission of the missing units at step 430. In one embodiment, the RLP message requests retransmission of all of the missing units in the buffer. In another embodiment, the RLP message requests retransmission of only the latest detected missing payload units. At step 432, the message is transmitted over the reverse link to the serving BS. Although an RLP processor is shown, other protocols allowing retransmission based on sequence number methods can be utilized.

Figure 5:
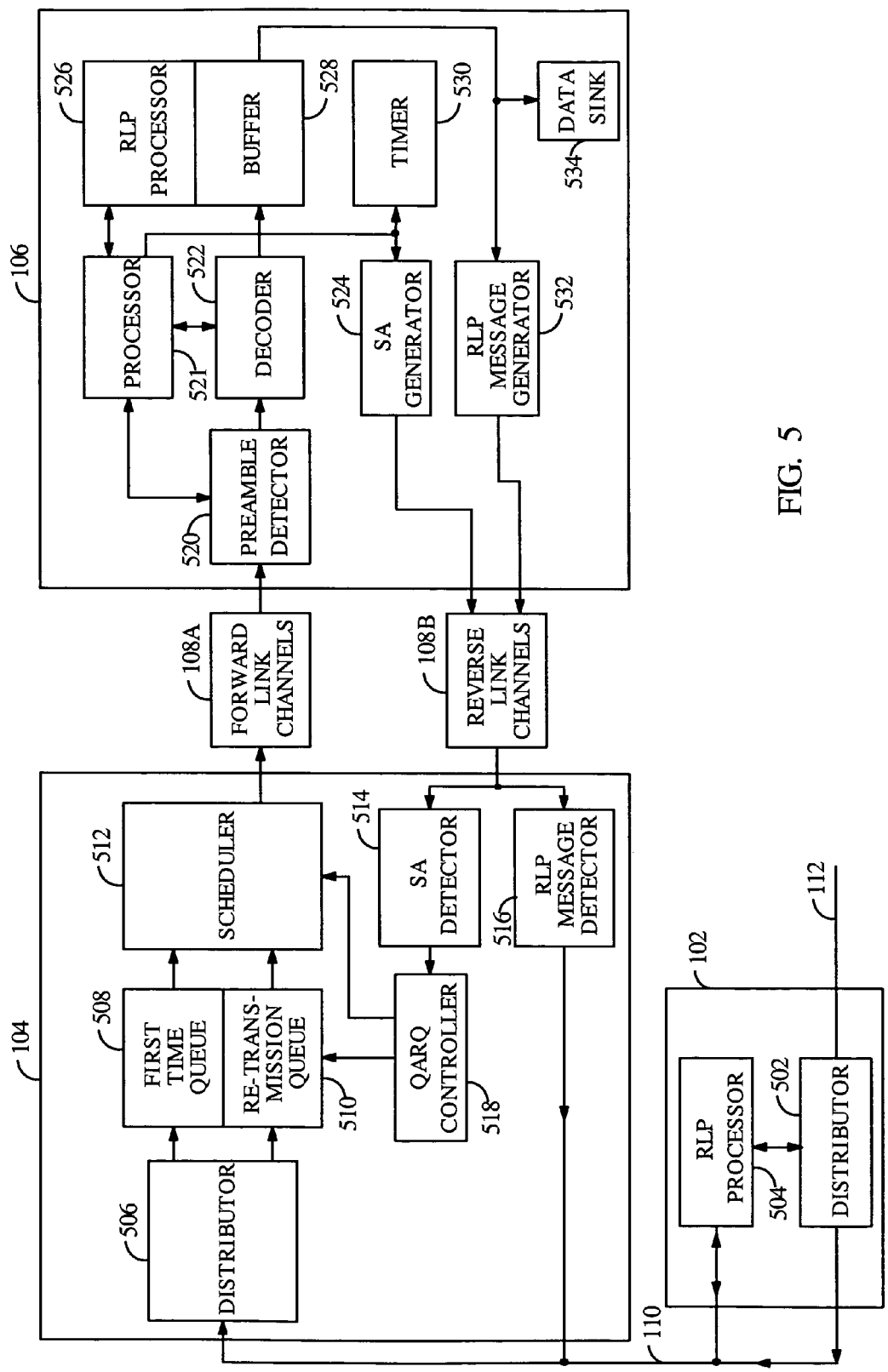
FIG. 5 is a detailed block diagram of the communication system of FIG. 1.

FIG. 5 shows an exemplary detailed block diagram of the communication system 100 of FIG. 1 in accordance with an embodiment. Data to be delivered to MS 106 arrive at BSC 102 through connection 112 from the PDSN (not shown). The data is formatted into payload units under the control of an RLP processor 504. RLP processor 504 also supplies a distributor 502 with information as to which packets have been requested for retransmission. The retransmission request is delivered to the RLP processor 504 through the RLP message. Distributor 502 distributes payload units through a backhaul to BS 104, which serves the MS (MS 106 in this example) for which the data is intended.

The payload units that arrived at BS 104 through the backhaul 110 are provided to a distributor 506. Distributor 506 tests whether the payload units are new payload units or payload units provided by the RLP processor 504 for retransmission. If the payload units are to be retransmitted, the payload units are provided to a retransmission queue 510. Otherwise, the payload units are provided to a first time queue 508. The payload units are then assembled into packets in accordance with a data rate requested by MS 106.

Assembled packets are provided to a scheduler 512. The scheduler 512 cooperates with a QARQ controller 518 on assigning priority between the first time packets and the packets intended for retransmission to MS 106. The packet transmitted to the MS 106 remains in the queues 508 and 510, while the BS 104 waits for an SA from MS 106. The data units are transmitted over forward link 108A to MS 106.

The packets arriving at MS 106 over the forward link 108A are provided to a preamble detector 520, which detects and decodes a preamble of the packets. The preamble is provided to a processor 521, which compares the decoded preamble to a reference preamble. The packet is discarded if the preamble indicates that the packet is intended for another MS. Otherwise, the packet is provided to a decoder 522, which decodes the packet. The decoded packet is provided to the processor 521, which also evaluates a quality metric of the packet. The evaluated quality metric and the quality metric contained in the received packet are compared, and based on the comparison an SA generator 524 generates an appropriate SA. Preamble detector 520, decoder 522, and processor 521 are shown as separate elements. However, one skilled in the art will appreciate that the physical distinction is made for explanatory purposes. Preamble detector 520, decoder 522, and processor 521 may be incorporated into a single processor accomplishing all the processing functions. Moreover, transmission and reception of forward and reverse link signals involve other functions such as data channel generation and RF/IF units that are not shown for simplicity. One skilled in the art appreciates that such functions in various configurations are possible, and often necessary, for proper transmission and reception of forward and reverse link signals.

If a packet was incorrectly decoded, i.e., the evaluated quality metric and the quality metric contained in the received packet do not match, an SA is sent and a timer 530 for the SA is started. In the exemplary embodiment, the SA is a NAK represented by a bit of non-zero energy. The purpose of the timer 530 is to limit a period for which MS 106 waits for retransmission of the payload units of the incorrectly decoded packet. If the payload units of the incorrectly decoded packet are not received within the timer 530 expiration period for the NAK associated with the incorrectly decoded packet, the QARQ processing is aborted. A retransmission of the missing payload units is handled by RLP processor 526.

If a packet was correctly decoded, the payload unit(s) contained in the packet are stored in a buffer 528. The RLP sequence number(s) of the payload unit(s) contained in the packet is checked by the decoder 522 against an expected value of the RLP sequence number(s). If the RLP sequence number(s) indicates contiguity, all the payload units with contiguous sequence numbers contained in the buffer 528 are provided to an RLP processor 526. Otherwise, the timer 530, corresponding to the last NAK sent, is checked. If the time has not expired, the payload units are stored in the buffer 528, and the MS 106 waits for retransmission of the missing payload units or expiration of the timer 530 for the last NAK sent. If the timer 530 for a particular NAK for a particular set of missing payload units has expired, all payload units in the buffer 528 with sequence numbers higher than the missing units associated with the particular NAK and lower than the missing units associated with the next NAK, if any, are provided to RLP processor 526.

The RLP processor 526 checks the sequence numbers of the delivered payload units. If the sequence numbers indicate contiguity, the RLP processor 526 delivers data from the buffer 528 to the data sink 534. Otherwise, the RLP processor 526 instructs RLP message generator 532 to generate an RLP message requesting retransmission of the missing units. In one embodiment, the RLP message requests retransmission of all of the missing units in the buffer 528. In another embodiment, the message requests retransmission of only the latest detected missing payload units. The message is then transmitted over the reverse link 108B to BS 104.

The data containing the SA and arriving at the BS 104 over the reverse link is provided to an SA detector 514 and an RLP message detector 516. If the received data contains an ACK, which is detected in SA detector 514, the QARQ controller 518 removes the packet associated with the ACK from the queues 508 and 510. If a NAK is received, the QARQ controller 518 checks whether parameters controlling retransmission were exceeded. In an exemplary embodiment, the parameters include the maximum number of times a packet can be retransmitted and the maximum time for which a packet can remain in the first-time queue 508 after the packet has been transmitted. If the parameters were exceeded, the QARQ controller 518 removes the packet from the queues 508 and 510. Otherwise, the QARQ controller 518 instructs the scheduler 512 that the packet be rescheduled for transmission with higher priority. The packet is moved from the first-time queue 508 to the retransmission queue 510 if the QARQ controller 518 determines that the non-acknowledged packet resides in the first time queue 508.

If the received data contains an RLP retransmission request, which is detected by the RLP message detector 516, the detector 516 provides the RLP message to the RLP processor 504 through the backhaul 110. The RLP processor 504 then initiates procedure for re-transmitting the packet in accordance with the RLP implementation.

Figure 6:
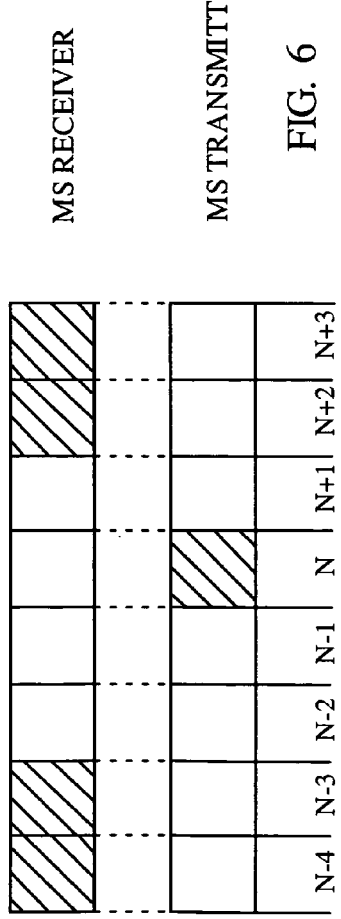
FIG. 6 is a diagram showing timing associated with packet processing at a receiving terminal.

FIG. 6 illustrates a timing relationship between a packet received at MS 106 and an SA transmitted from MS 106. In slots n-4 or n-3, MS 106 receives a packet over the forward channel link 108A, and determines if the packet was intended for MS 106. The MS 106 discards the packet if the packet was not intended for the MS 106. Otherwise, the MS 106 decodes the packet, evaluates a quality metric of the packet, and compares the evaluated quality metric with the quality metric contained in the packet in slots n-4 or n-3. In slot n, MS 106 sends an SA back to BS 104 over the reverse channel link 108B. In slot n+1, the SA received at BS 104 is decoded and provided to a QARQ controller. In slots n+2, n+3, BS 104 retransmits the packet if so requested. The position of the slots on the received forward link channel 108A and the reverse link channel 108B is synchronized at MS 106. Therefore, the relative position of slots on the forward channel link 108A and the reverse channel link 108B is fixed. BS 104 can measure a round trip delay between BS 104 and MS 106. Consequently, the time slot in which the SA must arrive at the BS 104 can be ascertained.

The relation between the received packet processing and the SA is determinable by fixing the number of slots between receiving a packet and sending an SA back, i.e., slots n-2, n-1. Consequently, BS 104 can associate each packet with each SA. One skilled in the art will understand that FIG. 6 is provided to illustrate the concept. Consequently, the number of slots allocated for a particular event may change, e.g., decoding and evaluating of a quality metric may occur in more or less than two slots. Furthermore, certain events are inherently variable, e.g., length of a packet, delay between the SA reception and the packet retransmission. In another embodiment, the relation between the received packet processing and the SA is determinable by including information in the SA as to which packet is to be retransmitted.

Figure 7:
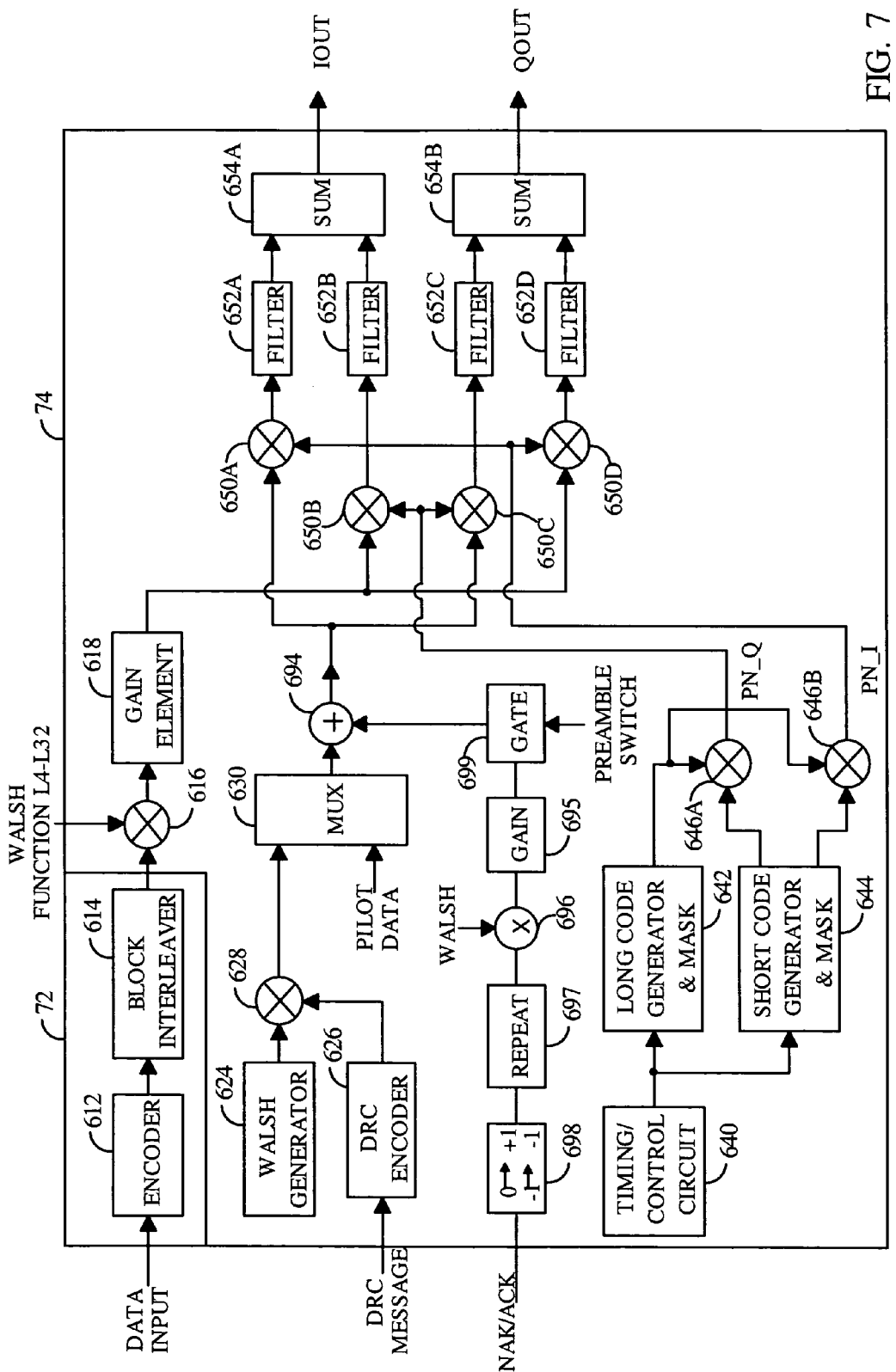
FIG. 7 is a block diagram of an exemplary reverse link architecture.

An exemplary block diagram of the pilot/DRC channel on the reverse link is shown in FIG. 7 in accordance with an embodiment. The DRC message is provided to DRC encoder 626, which encodes the message in accordance with a predetermined coding format. Coding of the DRC message is important because the error probability of the DRC message needs to be sufficiently low because incorrect forward link data rate determination impacts the system throughput performance. In the exemplary embodiment, DRC encoder 626 is a rate (8,4) CRC block encoder that encodes the 3-bit DRC message into an 8-bit code word. The encoded DRC message is provided to multiplier 628, which covers the message with the Walsh code that uniquely identifies the destination BS for which the DRC message is directed. The Walsh code is provided by Walsh generator 624. The covered DRC message is provided to multiplexer (MUX) 630, which multiplexes the message with the pilot data.

Figure 8:
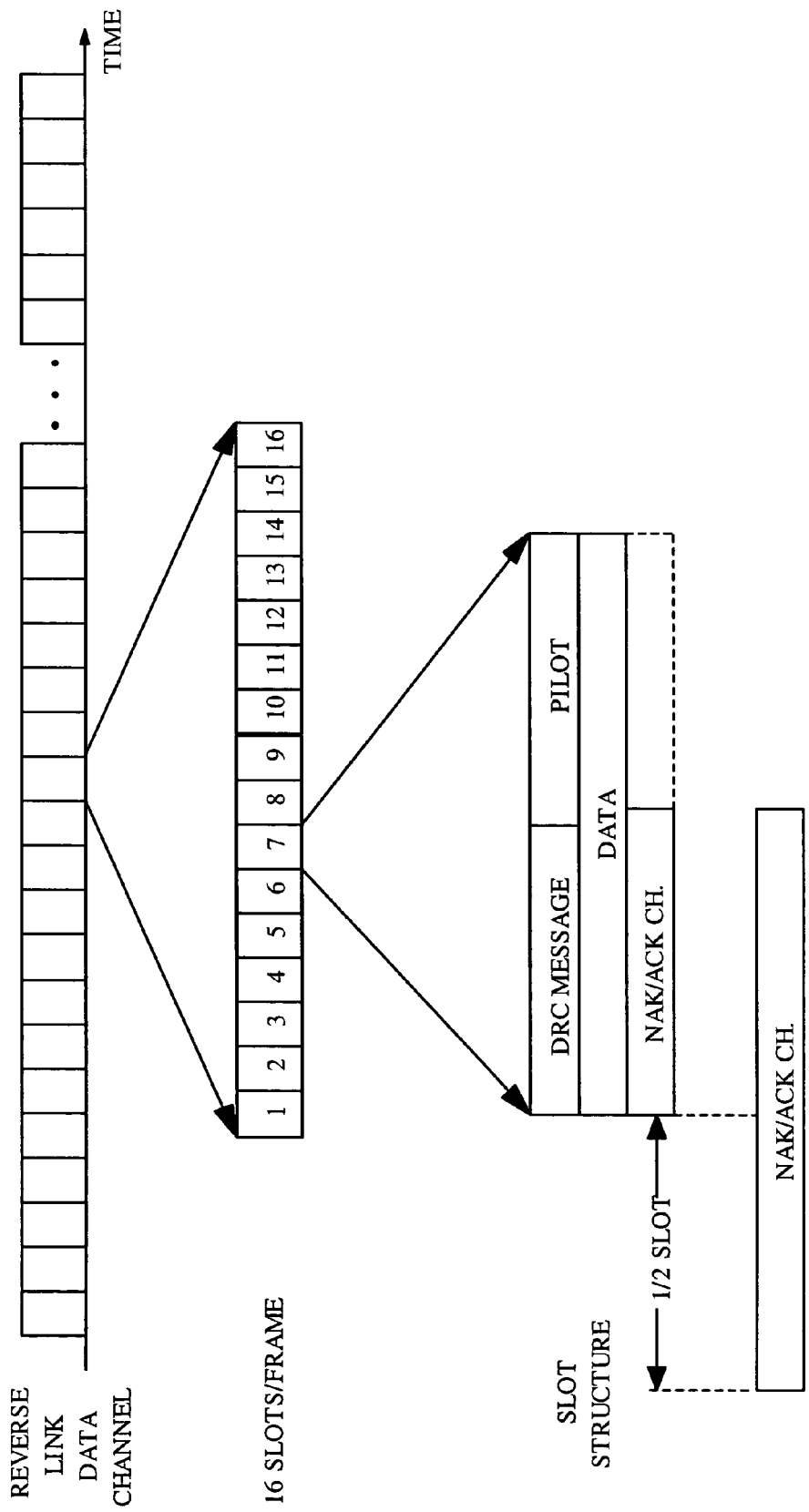
FIG. 8 is an exemplary timing diagram of a reverse link showing ACK/NAK channel timing with respect to slot timing used in a communication system.

Referring to FIG. 8, a reverse link channel slot structure is shown in accordance with an embodiment. Each frame may be divided into 16 slots. At least one of the slots may be used for transmission of the DRC messages and pilot data. Although the muxing operation performed by MUX 630 is shown to include the DRC message on one-half of a slot and the pilot message on the other half of the same slot, the DRC message and the pilot information may be placed in any part of the time slot.

Referring to FIG. 4 again, at steps 412 and 416, an SA generator generates either an ACK or NAK message for transmission to the BS based on the comparison of the metrics made at block 410. Generating either NAK or ACK at respectively steps 412 and 416 depends on whether at step 402 the MS has detected a preamble matching a preamble assigned to the MS. A packet of data may be divided into several units. Each unit is transmitted during a slot time. Each unit of data has a sequence number. The first data unit is transmitted with a preamble. The mobile unit must first detect and match the preamble before deciding whether to decode the data. Data units subsequent to the first data unit may not have the preamble. The mobile unit keeps track of the data unit sequence numbers until all data units have been received. If a data unit is received and decoded without passing the metric at step 410, the mobile unit sends a NAK message to the BS for retransmission of the failed data unit. If the data unit passes the metric, the MS sends an ACK message at step 416 to the BS.

An MS in an exemplary embodiment may have three operating states. The first state may be an access state for initializing a contact with a BS. The next state may be a connected state when the MS is in a communication link with the BS. Another state may be an idle state when the MS processing activities are reduced for conserving battery power but nevertheless the MS is in a quasi contact with the BS. To get into a connected state, the MS may have to go through the access state. From the access state, the MS may go directly to idle state and then to the connected state. Several MSs in a connected state may be in contact with the same BS for receiving data packets.

The connected state may be divided into two logical states. The first logical connected state may be defined as when the MS has received a preamble of a data packet and is either awaiting or receiving data units subsequent to the first data unit that carried the preamble. The second logical connected state is when the MS expects to receive a data packet but has not detected the first data unit carrying the preamble. To limit transmission of ACK/NAK messages on the reverse link by several MSs in a connected state, each MS is required to receive the preamble before transmitting ACK/NAK messages. As a result, the MSs in the first logical connected state transmit ACK/NAK messages. In order for a MS to get into the first logical connected state, a preamble of the first data unit of a data packet must match at step 404. The "yes" indicator at the preamble match step 404 may be used to gate an ACK/NAK reverse channel transmitted from the MSs.

Referring to FIG. 7 again, the exemplary reverse link architecture in accordance with an embodiment includes an ACK/NAK reverse channel which is gated at a gate block 699. The gating control is generated by step 404. The gating control allows transmission of the ACK/NAK reverse channel when the preamble of the first data unit of a data packet has matched at the MS. The ACK/NAK message transmitted on the ACK/NAK reverse channel may be limited to a single data bit or symbol. The ACK/NAK message passes and repeats through a BPSK modulator shown at blocks 698 and 697. The BPSK-modulated ACK/NAK message is Walsh covered at block 696. The Walsh covered signal passes through a gain block 695 before being summed at a summer 694 with signals from the DRC and pilot channels. The ACK/NAK message, DRC message, and pilot data are provided to multipliers 650a and 650c, which spread the data with the PN_I and PN_Q signals, respectively. Thus, the ACK/NAK, DRC messages, and pilot are transmitted on both the inphase and quadrature phase of the sinusoid.

Input data of the traffic channel is encoded in an encoder 612 and block interleaved in a block 614 before Walsh covered in a multiplier 616. A gain element 618 adjusts the gain of the traffic channel. The result passes through multipliers 650B and 650D for channel spreading. The DRC message is encoded in a DRC encoder block 626. A Walsh generator 624 generates the Walsh functions for Walsh covering the encoded DRC message in a multiplier 628.

Walsh covered DRC message and pilot data are multiplexed in a MUX block 630. The results are summed in summer 694 with the gated NAK/ACK channel. The results of the summer 694 are channel spread in multipliers 650A and 650C. Code generators 642 and 644 generate long and short codes. The codes are multiplied in multipliers 646A and 646B to generate PN-I and PN-Q. A block 640 may provide the timing and control functions. The PN-I and PN-Q are used for channel spreading performed by multipliers 650A–650D. The results of multipliers 650A–650D are passed through filters 652A–562D. The outputs of filters 652A and 652B are summed in a summer 654A to generate I-channel, and outputs of filters 652C and 652D are summed in a summer 654B to generate the Q-channel.

Referring to FIG. 8, the ACK/NAK reverse channel may be half a slot time long. The ACK/NAK channel slot timing is set such that the receiver in the BS can decode the ACK/NAK information as quickly as possible. In an exemplary embodiment, the ACK/NAK half slot timing may be positioned in the first half slot timing of a time slot. Alternatively, the ACK/NAK reverse channel slot timing may be offset as much as a half slot time with respect to reverse DRC/pilot channel slot timing or other slot timings. The ACK/NAK reverse channel may alternatively occupy the entire slot timing.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus in a communication system comprising:
    a receiver to receive a plurality of data units of a data packet, the receiver being configured to determine whether a preamble in a first data unit of the packet matches a preamble assigned to the apparatus;
    a transmitter operative to transmit ACK/NAK (acknowledgement/negative acknowledgement) information on an ACK/NAK channel for every received data unit, the transmitter comprising:
        a multiplier to cover the ACK/NAK information with a code to define the ACK/NAK channel;
        a spreader operative to spread the covered ACK/NAK information; and
        a channel gate for gating said ACK/NAK channel based on whether the receiver detected a matching preamble in the first data unit received by said receiver, the channel gate being configured to prevent transmission of the ACK/NAK channel for all data units of the packet when the receiver determines the preamble in the first data unit does not match the preamble assigned to the apparatus.

2. The apparatus of claim 1 wherein said transmitter further includes:
    a BPSK modulator for modulating said ACK/NAK information;
    wherein the code used by the multiplier is a Walsh covering to produce Walsh covered ACK/NAK information for transmission on said ACK/NAK channel.

3. The apparatus of claim 1 further comprising:
    a summer for summing said ACK/NAK channel and a data rate control/pilot channel.

4. The apparatus of claim 3 wherein the spreader is operative to spread a result of said summer for transmission from said transmitter.

5. The apparatus of claim 1 wherein said ACK/NAK channel has a duration of half a time slot.

6. The apparatus of claim 1 wherein slot timing of said ACK/NAK channel is offset by a portion of a time slot from a slot timing used in said communication system.

7. The apparatus of claim 1 wherein said ACK/NAK channel is transmitted by a portion of a slot time in advance of a slot timing used in said communication system.

8. The apparatus of claim 1, wherein the ACK/NAK information comprises a single bit.

9. The apparatus of claim 1, wherein the spreader spreads the covered ACK/NAK information with PN (pseudo-random noise) sequences.

10. A method in a communication system comprising:
    receiving a plurality of data units of a data packet;
    determining whether a preamble in a first data unit of the packet matches a preamble assigned to a mobile station;
    transmitting ACK/NAK (acknowledgement/negative acknowledgement) information on an ACK/NAK channel for every received data unit;
    covering the ACK/NAK information with a code to define the ACK/NAK channel;
    spread the covered ACK/NAK information; and
    gating said ACK/NAK channel based on whether a matching preamble is detected in the first received data unit, said gating preventing transmission of the ACK/NAK channel for all data units of the packet when the preamble in the first data unit does not match the preamble assigned to the mobile station.

11. The method as recited in claim 10 wherein transmission of said ACK/NAK information on said ACK/NAK channel has a duration of half a time slot.

12. The method as recited in claim 10 wherein said ACK/NAK channel slot timing is offset by a portion of a time slot from a slot timing used in said communication system.

13. The method of claim 10 wherein said ACK/NAK channel is transmitted by a portion of a slot time in advance of a slot timing used in said communication system.

14. The method as recited in claim 10 further comprising:
    modulating said ACK/NAK information according to a BPSK modulation scheme;
    wherein the code is a Walsh covering to produce Walsh covered ACK/NAK information.

15. The method as recited in claim 10 further comprising:
    summing said ACK/NAK channel and a data rate control/pilot channel.

16. The method as recited in claim 15 further comprising:
    spreading a result of said summing for transmission.

* * * * *